United States Patent Office 2,909,852
Patented Oct. 27, 1959

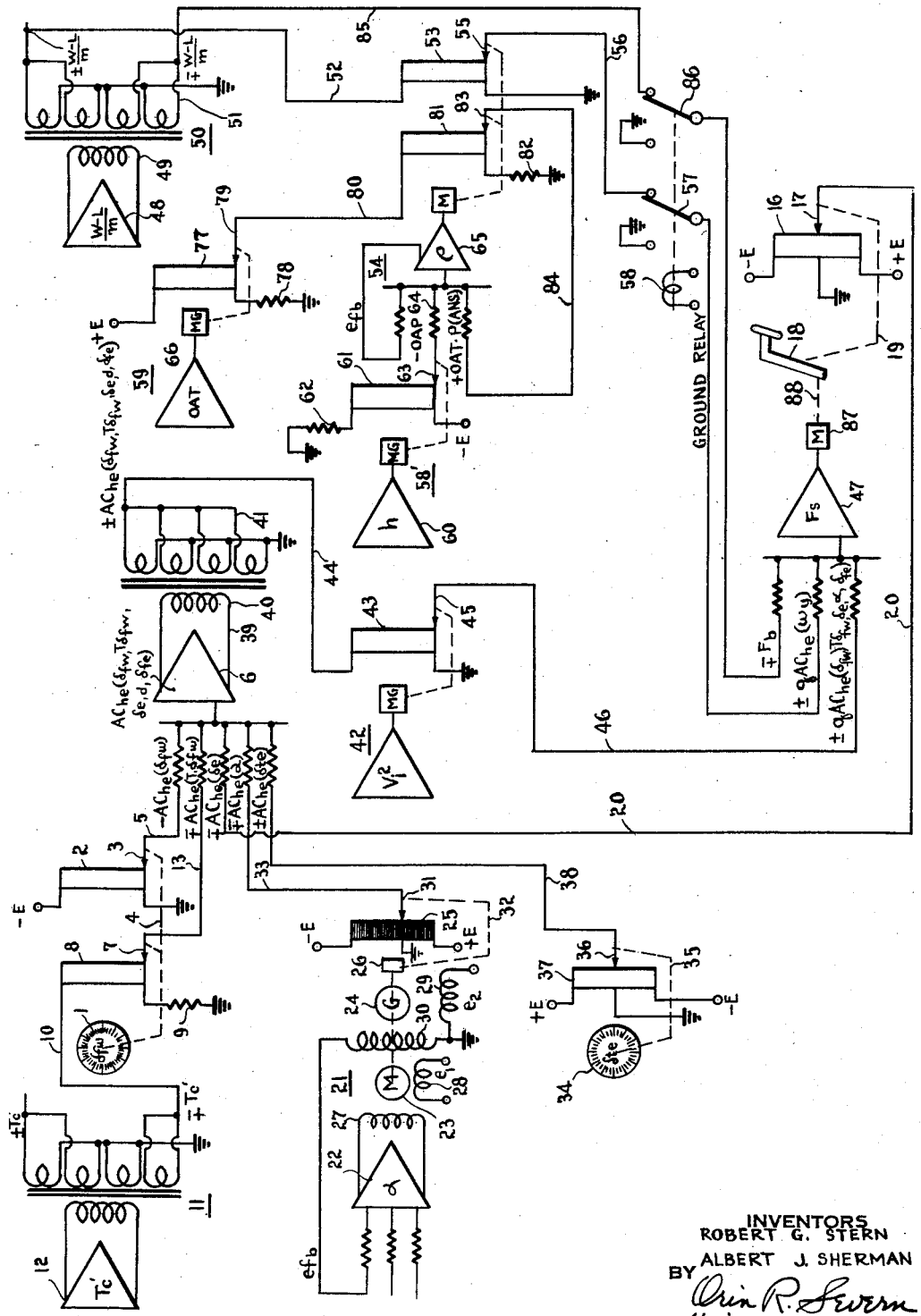

2,909,852

STICK FORCE SYSTEM FOR AIRCRAFT TRAINERS

Robert G. Stern, West Caldwell, N.J., and Albert J. Sherman, New York, N.Y., assignors to Curtiss-Wright Corporation, a corporation of Delaware Application June 14, 1954, Serial No. 436,533

4 Claims. (Cl. 35—12)

This invention relates to flight training apparatus and particularly to means for realistically simulating forces acting on the control stick of an aircraft under varying conditions of flight.

The control stick of an aircraft is subject to a number of forces as it is moved toward or away from the pilot causing the aircraft to climb or dive respectively due to the aerodynamic forces acting upon the elevator. In modern aircraft of certain types as for example the C–119 (Air Force designation), the control stick is subject to an additional force when moved toward the pilot or away from him due to the effect of a bob weight which is secured on a lever arm connected to the control stick, such bob weight being provided for the express purpose of bringing home to the pilot the degree of acceleration to which he is being subjected. The force transmitted to the control stick due to the bob weight is directly proportional to the aircraft acceleration and usually acts in a direction opposing further movement of the stick by the pilot. Obviously, in aircraft of the type mentioned, the pilot in operating the stick so as to cause the plane to climb or dive must overcome the combined result of the aerodynamic forces acting upon the elevator and the force acting upon the bob weight due to the acceleration of the aircraft.

It is desirable that a prospective pilot of an aircraft such as described receive training in an aircraft trainer in the operation of the control stick and that the forces acting thereon under actual flight conditions be realistically simulated in the training apparatus. This invention accordingly has as its prime object the provision of means for effectively simulating the forces acting on the control stick of such an aircraft as the stick is moved toward or away from the pilot due to the aerodynamic forces and the bob weight effect.

The invention will be more fully set forth in the following description referring to the following drawings, and the features of novelty will be pointed out with particularity in the claims annexed to and forming a part of this specification.

The drawing is a schematic illustration showing apparatus for simulating the aforementioned stick forces.

The forces acting on a control stick occasioned by the aerodynamic forces acting on the elevator of an aircraft and affecting the ease with which the stick may be moved fore and aft in the airplane may be expressed by the formula:

(1) $$F_a = AC_{he} q$$

where $F_a$ denotes the total of such forces; $A$ is a constant for the aircraft in question; $C_{he}$ is the hinge moment coefficient of the aircraft elevator; and $q$ is equal to $\frac{1}{2}\rho V^2$, $\rho$ being the density of air at the altitude of flight and $V$ being the air speed. Alternatively, Formula 1 may be written as follows:

(2) $$F_a = q A C_{he}(\delta_{fw}, T\delta_{fw}, \delta_e, \alpha, \delta_{te}) + q A C_{he}(\omega_y)$$

where the terms $C_{he}(\delta_{fw}, T\delta_{fw}, \delta_e, \alpha, \delta_{te})$ and $C_{he}(\omega_y)$ respectively represent increments which in summation are equal to the overall hinge moment coefficient $C_{he}$ of Formula 1. The increment $C_{he}(\delta_{fw}, T\delta_{fw}, \delta_e, \alpha, \delta_{te})$ represents a portion of the overall hinge moment coefficient determined according to the angle of the wing flaps $\delta_{fw}$, the combined effect of thrust $T$ and wing flap angle $\delta_{fw}$, the angle of the elevator $\delta_e$, the angle of attack of the aircraft $\alpha$, and the angle of the elevator tabs $\delta_{te}$. The factors represented by the symbols $\delta_{fw}, T, \delta_e, \alpha$ and $\delta_{te}$ all contribute to a determination of the aerodynamic force effect since they affect the angle with which the air stream about the airplane impinges on the elevator. The increment $C_{he}(\omega_y)$ represents a portion of the overall hinge moment coefficient dependent upon the aircraft rate of pitch $\omega_y$, rate of pitch being a significant factor in determining aerodynamic forces because it also affects the angle with which the air stream impinges on the elevator.

Apparatus is provided for computing both terms, namely, $qAC_{he}(\delta_{fw}, T\delta_{fw}, \delta_e, \alpha, \delta_{te})$ and $qAC_{he}(\omega_y)$ of Equation 2, and the means for computing the term $qAC_{he}(\delta_{fw}, T\delta_{fw}, \delta_e, \alpha, \delta_{te})$ will first be described. Such means includes wing flap control dial 1, and a potentiometer card 2 having a slider contact 3 connected to the dial by suitable mechanical connections 4 so that the contact may be disposed along the potentiometer card by means of the dial. The dial 1 is intended to simulate flap control means of an aircraft and is positionable by a student pilot undergoing training in an aircraft trainer provided with the herein described apparatus. A voltage is derived at contact 3 according to the position of dial 1 and fed over line 5 to summing amplifier 6 to provide input signal $-AC_{he}(\delta_{fw})$ representing the product of the constant $A$ and the quantity $C_{he}(\delta_{fw})$ which denotes the effect of wing flap angle in determining the hinge moment coefficient increment $C_{he}(\delta_{fw}, T\delta_{fw}, \delta_e, \alpha, \delta_{te})$.

As shown, the dial 1 also connects by means of the mechanical connections 4 with the slider contact 7 of another potentiometer 8, such potentiometer being energized at one end by the A.C. voltage $\pm T_c'$ representing thrust coefficient. The other end of potentiometer 8 connects with ground through resistor 9. The voltage $\pm T_c'$ is fed over line 10 to the potentiometer 8 from the negative output terminal of transformer 11 which is energized by the output of line amplifier 12. Amplifier 12 is energized as shown in our copending application for "Flight Computing System," S.N. 436,532, filed June 14, 1954 (of even date), now Patent 2,858,623, and assigned to the same assignee as the present invention. Slider contact 7 of potentiometer 8 is positioned along the potentiometer card by means of wing flap control dial 1, and a voltage is derived at the slider contact in accordance with the thrust coefficient voltage $\pm T_c'$ and the position of the dial. Such voltage is fed over line 13 to amplifier 6 to provide input signal $\pm AC_{he}(T, \delta_{fw})$, the term $C_{he}(T, \delta_{fw})$ representing the effect of thrust according to wing flap position in determining the quantity $C_{he}(\delta_{fw}, T\delta_{fw}, \delta_e, \alpha, \delta_{te})$.

Summing amplifier 6 is also provided with input signals $\pm AC_{he}(\delta_e)$, $\pm AC_{he}(\alpha)$, and $\pm AC_{he}(\delta_{te})$, the terms $C_{he}(\delta_e)$, $C_{he}(\alpha)$ and $C_{he}(\delta_{te})$, respectively representing the effect of elevator angle, angle of attack and tab angle in determining the hinge moment coefficient increment $C_{he}(\delta_{fw}, T\delta_{fw}, \alpha, \delta_{te})$. Means for deriving the input signal $\pm AC_{he}(\delta_e)$ include potentiometer 16 having opposite ends energized by the A.C. voltages $+E$ and $-E$ respectively and being connected at the mid-point thereof to ground. A slider contact 17 is positioned along the potentiometer card by means of control stick 18 which simulates the control stick of the aircraft, the control stick being connected to the slider contact by mechanical connections 19. A voltage is derived at slider contact 17 according to the position of the control stick as determined by a student pilot and such voltage is fed over line 20 to amplifier 6 to provide input signal $\pm AC_{h_e}(\delta_e)$.

The input signal $\pm AC_{h_e}(\alpha)$ to summing amplifier 6 is dependent upon the operation of the angle of attack servo ($\alpha$) which is designated by the reference character 21. The angle of attack servo ($\alpha$) is typical of a number of other servo systems included in the herein described apparatus and will by way of example be described in some detail. Such servo includes servo amplifier 22 to which are applied a number of control voltages, a motor 23 responsive to the amplifier output, a feed-back generator 24 driven by the motor 23 and a potentiometer 25 having its slider contact connected through a gear reduction box 26 to the motor generator combination. Servo amplifier 22 is a summing amplifier for determining the resultant of input voltages and is of a type well-known in the art for algebraically summing a plurality of A.C. voltages of varying magnitude and polarity. A detailed circuit illustration is therefore unnecessary.

As indicated the output of the amplifier is used to control a servo network including a motor-generator set diagrammatically indicated in other parts of the drawing as M.G. The servo motor 23 is of the two phased type, having a control phase 27 which is energized by the amplifier output, and another phase 28 which is energized by a constant reference A.C. voltage $e_1$ de-phased 90° from the control voltage. The operation of this type of motor is well-known, rotation being in one direction when the control and reference voltages of the respective phases have the same instantaneous polarity, and in the opposite direction when the instantaneous polarity of the control voltage is reversed with respect to the reference voltage, the rate of rotation in both cases depending on the magnitude of the summed input signals. The generator 24 which is driven by the servo motor is a two phased generator having one phase 29 energized by a 90° de-phased reference voltage $e_2$, the other phase 30 generating according to the motor speed a feed-back voltage $e_{fb}$ for purposes of velocity control.

The potentiometer resistance element 25 of the angle of attack servo and other potentiometers shown in the drawings may be of the well-known card type and are of circular band form in practice, but are diagrammatically illustrated in plane development for clarity. A structural arrangement which may be conveniently used for a servo motor and potentiometer combination of the character referred to is shown in Patent No. 2,341,749 issued December 2, 1947 to R. B. Grant for "Potentiometer Housing and Positioning Structure."

Potentiometer card 25 is provided with slider contact 31 which is positioned along the card by the servo motor which connects with the slider contact through the gear reduction box 26 and suitable mechanical connections 32. The slider contact derives, i.e. picks off potentiometer voltages depending upon the contact position and the potentiometer is shaped or contoured so that the derived voltage at the slider contact bears a certain relationship to linear movement of the contact depending upon the particular function of the potentiometer. The potentiometer has a voltage impressed across its terminals depending as to instantaneous polarity and magnitude according to the potentiometer function.

The angle of attack servo computes angle of attack according to a number of input control signals which are determined by the operation of simulated aircraft controls in the trainer. The control signals for the angle of attack servo and the manner in which they are derived is indicated in our aforementioned pending application. In accordance with the operation of the angle of attack servo $\alpha$ the slider contact 31 is positioned along the potentiometer card 25 which as shown is energized at opposite ends by the A.C. voltages $+E$ and $-E$ respectively. A voltage is derived at the slider contact 31 and fed over line 33 to amplifier 6 to provide the input signal $\pm AC_{h_e}(\alpha)$ hereinbefore referred to.

The remaining input signal $\pm AC_{h_e}(\delta_{te})$ to amplifier 6 is determined in accordance with the position of a simulated elevator tab control dial 34 as selected by a student pilot. As shown, dial 34 connects by mechanical connections 35 with the slider contact 36 of a potentiometer 37 which is energized at opposite ends by the A.C. voltages $+E$ and $-E$ respectively and is connected at its mid-point with ground. A voltage is derived at slider contact 36 and is fed over line 38 to amplifier 6 providing input signal $\pm AC_{h_e}(\delta_{te})$.

The various input signals to amplifier 6 are all summed therein and thence fed to the primary winding 39 of a transformer 40 to provide the secondary winding 41 thereof with an output signal $\pm AC_{h_e}(\delta_{fw}, T\delta_{fw}, \delta_e, \alpha, \delta_{te})$. This output signal represents the first term on the right hand side of the Equation 2 except for the quantity $q$. Suitable means are however provided for deriving this quantity which as hereinbefore stated is equal to $\frac{1}{2}\rho V^2$. Such means includes the indicated air speed servo ($V_i^2$) bearing reference character 42 which may be controlled in the manner indicated in our aforementioned pending application. As shown, the indicated air speed servo ($V_i^2$) includes the potentiometer card 43 which is energized at one end over line 44 by the signal $\pm AC_{h_e}(\delta_{fw}, T\delta_{fw}, \delta_e, \alpha, \delta_{te})$, the other end of the potentiometer being grounded. A slider contact 45 is positioned along the potentiometer according to the operation of the ($V_i^2$) servo, and a voltage is derived at the slider contact representing the product $\pm V_i^2 \cdot AC_{h_e}(\delta_{fw}, T\delta_{fw}, \delta_e, \alpha, \delta_{te})$ which may also be expressed as $$\pm \frac{\rho V^2}{\rho_0} AC_{h_e}(\delta_{fw}, T\delta_{fw}, \delta_e, \alpha, \delta_{te})$$

where $\rho_0$ is a constant denoting standard atmospheric density at sea level. Such voltage is fed over line 46 to a summing amplifier 47, the matter of constants being taken into account by means of an input resistor to provide input signal $\pm qAC_{h_e}(\delta_{fw}, T\delta_{fw}, \delta_e, \alpha, \delta_{te})$ which represents the first term on the right hand side of the Equation 2 for $F_a$.

The second term $qAC_{h_e}(\omega_y)$ on the right hand side of Equation 2 for the aerodynamic forces $F_a$ acting on the elevator may be written as $$A'\rho\left(\frac{W-L}{m}\right)$$

where $A'$ is another aircraft constant proportional to A, W represents aircraft weight, L represents the lift, and $m$ denotes the mass.

The equivalence of these terms may be shown as follows:

From basic aerodynamic theory there are obtained equations (3) $$C_{h_e}(\omega_y) = \frac{\partial C_{h_e}}{\partial\left(\frac{\omega_y C}{2V}\right)} \cdot \frac{\omega_y C}{2V}$$

and (4) $$\omega_y - \dot{\alpha} = \frac{W-L}{mV} \text{ or } \omega_y = \dot{\alpha} + \frac{W-L}{mV}$$

where the new symbols $c$ and $\dot{\alpha}$ represent respectively the chord length of the aircraft wing and the rate of change of angle of attack. Multiplying both sides of Equation 4 by the factor $$\frac{c}{2V}$$

there is obtained (5) $$\frac{\omega_y C}{2V} = \frac{\dot{\alpha} c}{2V} + \frac{(W-L)c}{2mV^2}$$

Substituting the right hand side of Equation 5 in Equation 3 and multiplying both sides of Equation 3 by the factor $q$ there is obtained (6) $$qC_{h_e}(\omega_y) = q\frac{\partial C_{h_e}}{\partial\left(\frac{\omega_y C}{2V}\right)} \cdot \left[\frac{\dot{\alpha}c}{2V} + \frac{(W-L)c}{2mV^2}\right]$$

which may be rewritten recalling the equivalence of $q$ and $\tfrac{1}{2}\rho V^2$, as (7) $$qC_{h_e}(\omega_y) = \rho\frac{\partial C_{h_e}}{\partial\left(\frac{\omega_y c}{2V}\right)}\left[\frac{V^2}{2}\frac{\dot{\alpha}c}{2V} + \frac{(W-L)c}{4m}\right]$$

The first term within the bracket of Equation 7 represents a short period oscillation with heavy damping and may be neglected in comparison to the second term which represents a long period fugoid oscillation with light damping.

Therefore Equations 6 and 7 may be rewritten approximately as (8) $$qC_{h_e}(\omega_y) = \rho\frac{\partial C_{h_e}}{\partial\left(\frac{\omega_y c}{2V}\right)} \cdot \frac{(W-L)c}{m\,4}$$

The partial derivative term $$\frac{\partial C_{h_e}}{\partial\left(\frac{\omega_y c}{2V}\right)}$$

appearing in Equations 3 to 7 is in actual practice a variable but may be represented with reasonable accuracy in the simulator as a constant $A''$ so that Equation 8 may now be rewritten (9) $$qC_{h_e}(\omega_y) = \rho A'' \cdot \frac{(W-L)c}{4m}$$

Multiplying both sides of Equation 9 by the factor $A$ and replacing the product of the constants $A$, $A''$ and $\frac{c}{4}$ by $A'$ there is obtained

(10) $$qC_{h_e}(\omega_y) = \rho A' \cdot \frac{(W-L)}{m}, \text{ q.e.d.}$$

Suitable means are provided for computing the quantity $$A'\rho\left(\frac{W-L}{m}\right)$$

including amplifier 48 which connects with the primary winding 49 of transformer 50 to provide the secondary winding 51 thereof with output voltages $$\pm\frac{W-L}{m} \text{ and } \pm\frac{W-L}{m}$$

at the positive and negative terminals respectively. The amplifier 48 is energized to provide the said voltages in the manner shown in our aforementioned pending application.

The voltage $$\pm\frac{W-L}{m}$$

is fed over line 52 to one end of a potentiometer 53 in the air density servo system 54, the other end of the potentiometer being connected to ground. A slider contact 55 is disposed along potentiometer 53 according to the operation of the air density servo ($\rho$) and a voltage $$\rho\left(\frac{W-L}{m}\right)$$

is derived at the slider contact which voltage is fed over line 56 including contact 57 of ground relay 58 provided the relay is de-energized, and through a suitable input resistor to provide amplifier 47 with an input signal representing the quantity $$\pm A'\rho\left(\frac{W-L}{m}\right)$$

As indicated, such signal also represents the second term $qAC_{h_e}(\omega_y)$ on the right hand side of the equation for the aerodynamic forces $F_a$.

Operation of the air density servo ($\rho$) is dependent upon operation of an altitude servo ($h$) bearing reference character 58', and an outside air temperature servo (OAT) designated by reference character 59. The altitude servo includes servo amplifier 60 which may be energized by control voltages as shown in our aforesaid pending application, and also includes potentiometer 61 which as shown is energized at one end by the negative A.C. voltage $-E$, the other end thereof being connected to ground through a resistor 62. A slider contact 63 is disposed along the potentiometer card 61 for deriving a voltage which is fed over line 64 to the servo amplifier 65 of the air density servo to provide input signal $-\text{OAP}$ representing outside air pressure as a function of altitude.

The outside air temperature servo (OAT) includes servo amplifier 66 having input control voltages as shown in the pending application of Robert G. Stern and William H. Dawson, Jr., for "Simulated Manifold Pressure System for Aircraft," S.N. 436,478, filed June 14, 1954 (of even date), now Patent 2,808,658, and assigned to the same assignee as the present invention. The (OAT) servo also includes the potentiometer 77 having one end energized by the A.C. voltage $+E$ and the other end connected to ground over resistor 78. A slider contact 79 is positioned along the potentiometer card in accordance with the servo operation, a voltage being derived at the contact reflecting the computed outside air temperature which voltage is fed over line 80 to one end of an answer card 81 of the air density servo. The potentiometer has its other end connected over resistor 82 to ground. A slider contact 83 is positioned along the potentiometer card according to the operation of the air density servo ($\rho$) deriving a voltage which is fed over line 84 to servo amplifier 65 to provide the signal $+\text{OAP}\cdot\rho(\text{ANS})$ reflecting the effect of outside air temperature on air density. As shown, servo amplifier 65 is provided with a feed back signal $e_{fb}$ from the servo amplifier itself rather than from a feed back generator which has been eliminated in air density servo ($\rho$). By reason of the various input signals the servo 58' is operated to accurately compute air density $\rho$.

As has been stated, the summing amplifier 47 is provided with input signals $\pm qAC_{h_e}(\delta, T\delta_{fw}, \delta_e, \alpha, \delta_{te})$ and $\pm qAC_{h_e}(\omega_y)$ which respectively represent the first and second terms on the right hand side of the equation for $F_a$, and in summation represent the total aerodynamic force effect $F_a$. In accordance with our invention amplifier 47 is however also provided with the additional input signal $\pm F_b$ representing the bob weight effect. Because of the manner in which aerodynamic force effect due to pitching as represented by the second term $qAC_{h_e}(\omega_y)$ in Formula 2 is derived, i.e. in terms of quantity $$A'\rho\left(\frac{W-L}{m}\right)$$

which as indicated is equal to $qAC_{h_e}(\omega_y)$, the input signal $\pm F_b$ for amplifier 47 may be provided without the necessity for apparatus additional to that already described by taking advantage of a derived relationship

(11) $$F_b = K\left(\frac{W-L}{m}\right)$$

It is necessary merely to utilize an output voltage provided at the secondary winding 51 of transformer 50, since such output voltage represents a term corresponding except for the constant K to the above quantity $$\left(\frac{W-L}{m}\right)$$

in the formula for $F_b$. Accordingly the output voltage $$\mp \frac{W-L}{m}$$

at the negative output terminal of winding 51 is fed over line 85 including contact 86 of relay 58 provided relay 58 is de-energized and a resistor to amplifier 47 to provide the input signal $$\mp K\left(\frac{W-L}{m}\right)$$

The ground relay 58 is controlled as shown in the pending application of Robert G. Stern, William H. Dawson, Jr., and Clinton H. Havill for "Training Apparatus for Representing Aircraft Engine Operation," S.N. 436,328, filed June 14, 1954 (of even date), now Patent 2,824,388, and assigned to the same assignee as the present invention, such relay being de-energized except when the simulated aircraft is supposedly on the ground.

The various input signals to amplifier 47 representing the effect of aerodynamic forces and the bob weight on the control stick are summed therein, the resulting summation representing the effect of both factors. The output of the amplifier is utilized to operate a motor 87 which as shown connects by suitable mechanical connections 88 with simulated control stick 18 so as to transmit the computed force effects to the stick thereby simulating for the student pilot the forces actually transmitted to the stick of the aircraft in actual flight as the stick is moved fore or aft by a pilot. One form of mechanical connection between the motor 87 and control stick 18 for transmitting the force effects is disclosed in a copending application S.N. 510,119, filed May 13, 1955 by Paul E. Grandmont for "Apparatus for Simulating Aircraft Control Loading and Feel" (continuation of S.N. 172,756, filed July 8, 1950), now Patent No. 2,804,698, granted September 3, 1957, and assigned to the same assignee as the present invention.

It should be understood that this invention is not limited to specific details of construction and arrangement thereof herein illustrated, and that changes and modifications may occur to one skilled in the art without departing from the spirit of the invention.

What is claimed is:

1. In an aircraft trainer having a plurality of simulated controls including an elevator control operable by a student pilot, function generating means associated with each of said controls for deriving an electrical signal in accordance with the position of the associated control, a plurality of output signal producing systems responsive respectively to input signals thereto derived from others of said systems and from said function generating means for computing a plurality of aerodynamic factors determinative of the simulated flight, one of said computing systems producing at least one signal representative of the factor $$\frac{W-L}{m}$$

where W represents the weight of the simulated aircraft, $m$ its mass, and L its lift, a second of said systems effective to compute air density, a third of said systems effective to compute the total force of resistance experienced by said pilot in operation of said elevator control responsive to input signals to said third system, and a torque means operatively connected to said third system and to said elevator control for exerting said total computed resistance force on said elevator control: the improvement comprising means for modifying said one $$\frac{W-L}{m}$$

signal in accordance with the operation of said second system to provide a resultant signal representing the contribution to said resistance force due to rate of pitch, and means for applying said resultant signal as an input signal to said third system to include in said exertion also said contribution.

2. Apparatus as set forth in claim 1 wherein the trainer also includes means for sensing presence of the simulated flight on ground, further provided with means responsive to said sensed on ground condition for precluding application of the aforesaid resultant signal to the aforesaid third system.

3. Apparatus as set forth in claim 1 further provided with means to apply a second $$\frac{W-L}{m}$$

signal similar to the aforesaid one $$\frac{W-L}{m}$$

signal directly to the aforesaid third system to represent a further contribution to the resistance force due to a bob weight connected to the elevator control thereby to include in the aforesaid exertion also said further contribution.

4. Apparatus as set forth in claim 3, wherein the trainer also includes means for sensing presence of the simulated flight on ground, further provided with means responsive to said sensed on ground condition for precluding application to the aforesaid third system of the aforesaid rate of pitch and bob weight representative signals.

References Cited in the file of this patent

UNITED STATES PATENTS

| | | |
|---|---|---|
| 2,350,351 | Grunberg | June 6, 1944 |
| 2,514,606 | Jenny | July 11, 1950 |
| 2,519,233 | Davis et al. | Aug. 15, 1950 |
| 2,627,675 | Kittredge | Feb. 10, 1953 |
| 2,687,580 | Dehmel | Aug. 31, 1954 |
| 2,695,145 | Lear et al. | Nov. 23, 1954 |
| 2,808,659 | Dehmel | Oct. 8, 1957 |